UNITED STATES PATENT OFFICE.

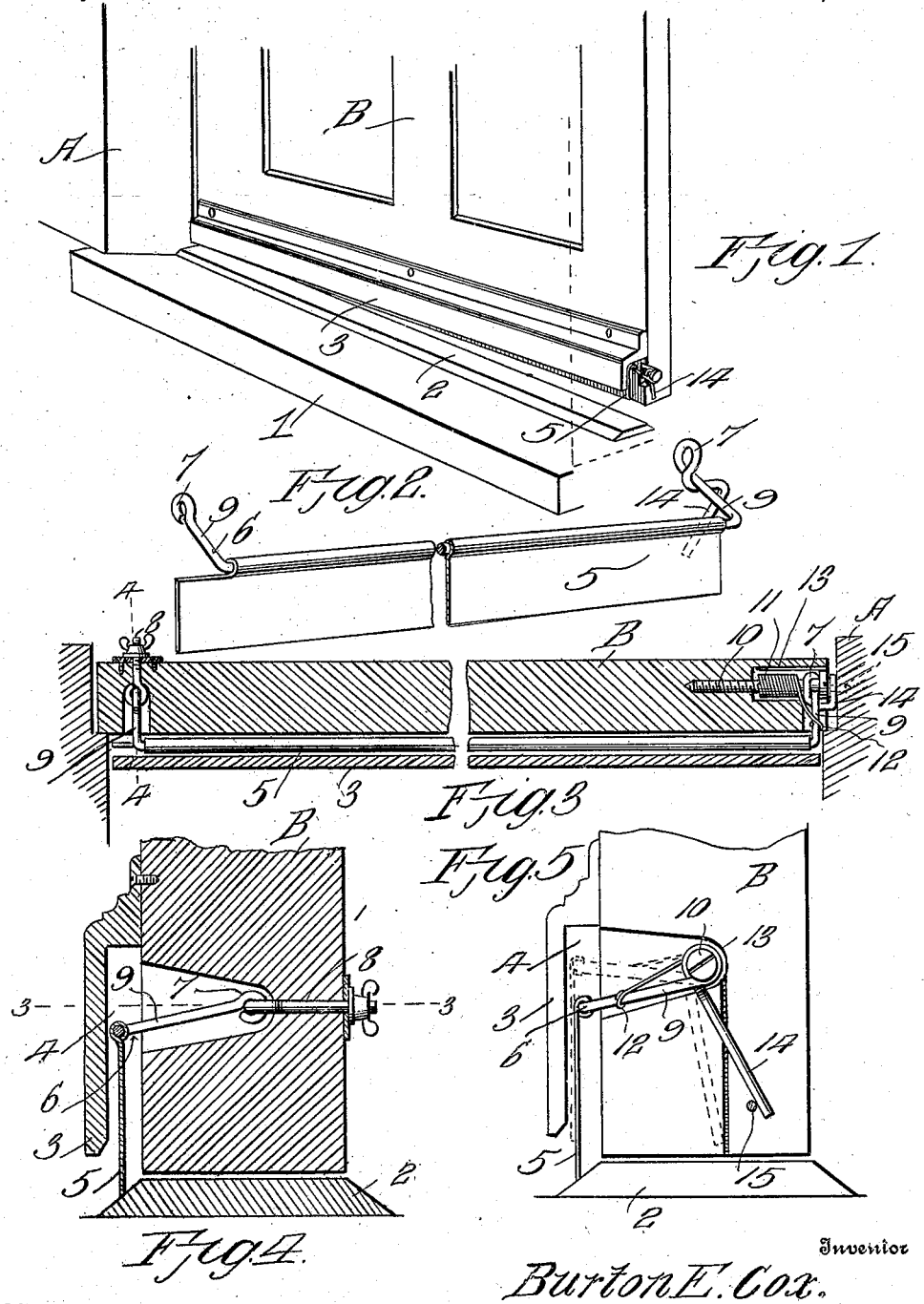

BURTON E. COX, OF SAN FRANCISCO, CALIFORNIA.

WEATHER-STRIP FOR DOORS.

No. 924,434.   Specification of Letters Patent.   Patented June 8, 1909.

Application filed May 8, 1908. Serial No. 431,633.

*To all whom it may concern:*

Be it known that I, BURTON E. COX, a citizen of the United States, residing at San Francisco, in the county of San Francisco and State of California, have invented new and useful Improvements in Weather-Strips for Doors, of which the following is a specification.

This invention relates to a weather strip for doors that is provided with means whereby the weather strip is automatically moved into engagement with the threshold or floor as the door is closed to exclude air, rain and dust entering a building under the door, and which is raised out of contact with the floor or threshold when the door is opened so that wear on the strip will be prevented.

The invention has for one of its objects to provide a device of this character which is comparatively simple and inexpensive to manufacture, and thoroughly reliable and efficient in use.

Another object of the invention is the provision of a weather strip movably mounted on the door and provided with a spring for raising the weather strip out of contact with the floor and having a member adapted to engage an abutment on the door frame for causing the weather strip to be automatically set or moved into contact with the floor or threshold.

With these objects in view and others as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a perspective view of the lower portion of a door and frame with my improved weather strip applied to the door. Fig. 2 is a perspective view of the weather strip with a portion broken away. Fig. 3 is a horizontal sectional view of the door taken on line 3—3, Fig. 4. Fig. 4 is a vertical section on line 4—4, Fig. 3. Fig. 5 is an edge view of the lower corner of the door showing the weather strip applied thereto.

In the present instance, I have illustrated the device as applied to a door having a threshold, but it is to be understood that it can be used to advantage on doors in which no threshold is employed, the weather strip being intended to bear against the floor.

Referring to the drawing, A designates a doorway having a sill 1 on which is a strip 2 and in the doorway is a door B of any approved construction. Extending across the door at the bottom thereof is a shield or guard 3 which is so shaped as to form a pocket 4 in which the weather strip 5 or guard is arranged. This weather strip may be of any approved construction and material and the same is supported on a wire frame 6 which has pintle-receiving eyes 7 whereby the frame is mounted to swing. At the inner hinged edge of the door is a recess into which one of the arms 9 of the frame 6 extends, and the eye of the said arm engages in an eye bolt 8 secured to the door, the eye of said bolt serving as a pivot to which one end of the frame 6 is attached. The other arm, as shown in Fig. 3, has its eye 7 mounted on a screw 10 that carries a helical torsional spring 11, one end of the spring being connected with the screw for adjusting the tension, while the other end is connected at 12 with the arm 9 so that the spring will tend to raise the weather strip to the dotted line position shown in Fig. 5. The lower corner of the door has a recess 13 for receiving the screw 10 and spring 11 and also the arm 9, and the extremity of the arm is bent into a member 14 extending outwardly from the edge of the door so as to engage an abutment 15 secured to the door frame. This abutment is so arranged that when the door is completely closed, the member 14 is moved from the dotted to the full line position, Fig. 5, so as to swing the frame 6 downwardly and bring the weather strip into contact with the threshold 2 or floor, as the case may be. While in this position, the spring is under tension so that as soon as the door is but slightly open, the frame 6 will be raised because of the arm 14 moving away from the abutment 15. It will thus be seen that the weather strip is automatically set by the closing of the door and automatically moved to inoperative position when the door is opened.

A weather strip of this character effectively excludes rain, dust and cold and is so designed as to be subject to relatively little wear and can be applied to any door, it being merely necessary to cut recesses 13 therein.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim is:—

1. The combination of a wire frame consisting of a straight middle portion and terminal arms, eyes on the extremities of the arms, means engaging in the eyes for pivotally mounting the frame on a door, a guard carried wholly by the frame and having its upper edge curled around the straight portion of the latter to form a hinged connection between the guard and frame, a spring arranged to raise the frame, a member secured to the frame, and a fixed abutment arranged in the path of the member to swing the frame downwardly during the closing of the door for setting the said guard.

2. The combination of a frame consisting of a straight rod-like portion provided with terminal arms disposed at right angles thereto, eyes on the extremities of the arms, an eye bolt for engaging one of the eyes for securing one end of the frame to the door, a screw passing through the other eye for securing the other end of the frame to the door, a torsional spring on the screw having one end fixed and the other end connected with one of the arms of the frame and arranged to urge the frame upwardly, a member connected with the arm that is mounted on the screw and disposed along the outer edge of the door, a guard connected with the straight portion of the frame to maintain a vertical position as the latter swings, and a fixed stop disposed in the path of the said member to depress the frame as the door closes.

3. The combination of a door having recesses, a frame having arms extending into the recesses, pivots in the recesses on which the arms are mounted, a spring on one of the pivots and engaging one of the arms for moving the frame upwardly, a weather guard carried solely by the frame, and having its upper edge hingedly connected with the latter, a shield on the door for covering the guard, a member on the frame disposed at the edge of the door, and an abutment with which the member engages for moving the frame against the tension of the spring to set the weather guard.

In testimony whereof I affix my signature in presence of two witnesses.

BURTON E. COX.

Witnesses:
 GEO. E. BEW,
 W. H. KOUNTZ.